(12) United States Patent
Park et al.

(10) Patent No.: US 6,275,315 B1
(45) Date of Patent: Aug. 14, 2001

(54) APPARATUS FOR COMPENSATING FOR DISPERSION OF OPTICAL FIBER IN AN OPTICAL LINE

(75) Inventors: Chan-sik Park; Jin-han Kim, both of Kyungsangbuk-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/109,046

(22) Filed: Jul. 2, 1998

(30) Foreign Application Priority Data

Aug. 28, 1997 (KR) .................................. 97-41968

(51) Int. Cl.[7] .................................................. H04B 10/00
(52) U.S. Cl. .......................... 359/153; 359/153; 359/161; 359/179; 385/31; 385/37; 385/24; 385/124
(58) Field of Search ..................................... 359/161, 173, 359/179, 153; 385/24, 124, 31, 37

(56) References Cited

U.S. PATENT DOCUMENTS

| | | | |
|---|---|---|---|
| 5,023,947 | 6/1991 | Cimini, Jr. et al. | 455/619 |
| 5,050,954 | 9/1991 | Gardner et al. | 385/16 |
| 5,557,468 | * 9/1996 | Ip | 359/615 |
| 5,633,743 | 5/1997 | Delavaux | 359/173 |
| 5,710,655 | 1/1998 | Rumbaugh et al. | 359/249 |
| 5,715,265 | * 2/1998 | Epworth | 372/38 |
| 6,005,702 | * 12/1999 | Suzuki et al. | 359/183 |
| 6,011,645 | * 1/2000 | Hong | 359/341 |
| 6,078,418 | * 6/2000 | Hansen et al. | 359/161 |

FOREIGN PATENT DOCUMENTS

| | | |
|---|---|---|
| 6265529 | 3/1987 | (JP) . |
| 6216467 | 8/1994 | (JP) . |
| 7202798 | 8/1995 | (JP) . |
| 7231297 | 8/1995 | (JP) . |
| 7-327012 | 12/1995 | (JP) . |

* cited by examiner

Primary Examiner—Leslie Pascal
Assistant Examiner—Chau M. Nguyen
(74) Attorney, Agent, or Firm—Leydig, Voit & Mayer, Ltd.

(57) ABSTRACT

An apparatus for compensating for dispersion of an optical fiber in an optical line, which compensates for dispersion generated in the optical fiber when an optical signal produced by an optical transmitter is transmitted to an optical receiver via the optical line, is provided. The apparatus includes a dispersion compensation fiber for compensating an optical signal produced by an optical transmitter in order to predict and compensate for dispersion generated in the optical line, a dispersion compensation filter for controlling the dispersion value of the optical signal dispersion-compensated by the dispersion compensation fiber, to gain zero overall dispersion, and an optical amplifier for amplifying a signal having a dispersion value adjusted by the dispersion compensation filter and outputting the result to the optical line. Accordingly, it is easy to zero a dispersion value of an optical fiber in the optical line by regulation of the dispersion compensation fiber and filter. When the dispersion value varies with the deterioration of the optical fiber in the optical line, continuous compensation is not possible using only the dispersion compensation fiber. However, continuous compensation is easily made by adding the dispersion compensation filter.

3 Claims, 2 Drawing Sheets

—— TOTAL DISPERSION
    OF GENERAL SINGLEMODE OPTICAL FIBER

▬▬ ZERO DISPERSION ON OPTICAL LINE

- - - DISPERSION BY
    DISPERSION COMPENSATION FIBER AND
    DISPERSION COMPENSATION FILTER

APPARATUS FOR COMPENSATING FOR DISPERSION OF OPTICAL FIBER IN AN OPTICAL LINE

BACKGROUND OF THE INVENTION

1. Field of the Invention

The present invention relates to an apparatus compensating for dispersion of an optical fiber in an optical line when an optical signal generated by an optical transmitter is transmitted to an optical receiver via the optical line, and, more particularly, to an apparatus compensating for dispersion of an optical fiber in an optical line using a dispersion compensation optical filter.

2. Description of the Related Art

When an optical signal is transmitted via an optical line in a high-speed optical transmission network, dispersion of the optical signal occurs. Accordingly, the maximum distance that the optical signal can be transmitted without compensation at a repeater is limited, and errors occur. To prevent these errors, dispersion of the optical line must be compensated. In general, the dispersion of the optical line is compensated by using a dispersion compensation fiber.

In order to calculate the total dispersion of optical fiber cables installed in the field, the optical fiber cables are produced in a factory, wound around a drum, and the ends of the produced fiber cable are connected to measuring equipment to measure the total dispersion. However, after being installed in the field, the ends of the optical cable are isolated from each other by tens to hundreds of kilometers, so it is difficult to measure the dispersion value in the field. Thus, a dispersion value per km is calculated, the length of a dispersion compensation optical fiber is thus determined, and the determined length is applied to compensate for the dispersion. However, this method does not produce accurate dispersion compensation.

In the prior art, when the optical fiber cables were produced in a factory and the dispersion measured, a conventional single-mode fiber typically has had a dispersion of, at most, 17 ps/nm/km at a wavelength of 1.55 $\mu$m. Here, the dispersion value is positive. The positive dispersion can be minimized to, at most, 2.7 ps/nm/km if using a dispersion shifted fiber designed to have a zero dispersion at a wavelength of 1.55 $\mu$m. However, since the dispersion affects the maximum distance between repeaters in high-speed transmission, a dispersion compensation fiber having a negative dispersion is needed. In particular, the conventional single mode fiber has a large dispersion, so that a dispersion compensation fiber must be utilized. That is, when the conventional single-mode fiber having a dispersion of 17 ps/nm/km is installed and used in a 40 km length, its total dispersion is 680 ps/nm/km. Accordingly, in order to obtain a zero dispersion, a dispersion compensation fiber having a negative dispersion of 680 ps/nm/km is applied to the optical line. However, the dispersion compensation fiber is modularized into 20 km, 40 km, 60 km, 80 km, etc. lengths, and installed and used in a rack of optical transmission equipment. Therefore, if the length of an optical line does not match one of the modularized distances, the dispersion cannot be accurately compensated, since an exact dispersion compensation fiber is not used.

As described above, use of the dispersion compensation fiber may cause the following problems. First, it is difficult to completely eliminate dispersion by attempting to match a total positive dispersion of an optical fiber in an optical line with a negative dispersion of a dispersion compensation fiber. Second, since dispersion varies with the deterioration of an optical fiber in the optical line, the dispersion compensation fiber cannot continuously compensate for the varying dispersion. Third, since the dispersion compensation fiber is modularized and packaged to have a constant dispersion, when dispersion compensation is made for an actual optical line, it is difficult to compensate the dispersion with a standard length of the dispersion compensation fiber. Since an optical line is installed with arbitrary length, modularization and standardization of the dispersion compensation fiber are not easy.

SUMMARY OF THE INVENTION

To solve the above problems, it is an objective of the present invention to provide an apparatus for compensating for dispersion of an optical fiber in an optical line, by which zero dispersion is achieved using a filter which regulates dispersion.

Accordingly, to achieve the above objective, there is provided an apparatus for compensating for dispersion of an optical fiber in an optical line when an optical signal produced by an optical transmitter is transmitted to an optical receiver via the optical line, the apparatus comprising: a dispersion compensation fiber for compensating the optical signal produced by the optical transmitter to a predetermined dispersion, to predict and compensate for dispersion generated in the optical line; a dispersion compensation filter for controlling the dispersion of the optical signal dispersion-compensated by the dispersion compensation fiber, to obtain zero overall dispersion; and an optical amplifier for amplifying a signal having a dispersion adjusted by the dispersion compensation filter and outputting the amplified signal to the optical line.

The apparatus for compensating for dispersion of an optical fiber on an optical line further comprises: a circulator for receiving the optical signal compensated by the dispersion compensation fiber and outputting that signal to the dispersion compensation filter, receiving the optical signal having a dispersion value adjusted by the dispersion compensation filter, and outputting that signal having the dispersion value adjusted to the optical amplifier; a photodetector detecting the optical signal having the dispersion value adjusted by the dispersion compensation filter, and converting the optical signal detected to an electrical signal; and a tracking unit receiving the electrical signal from the photodetector and adjusting the dispersion of the dispersion compensation filter to a predetermined value.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Figure 1:
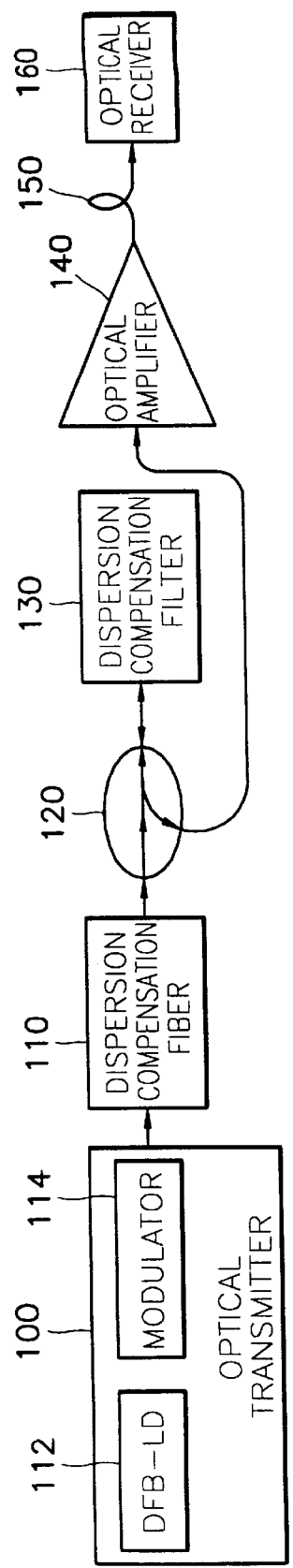
FIG. 1 is a block diagram illustrating a network configured to compensate for dispersion of an optical fiber on an optical line, according to a preferred embodiment of the present invention.

Referring to FIG. 1, a network for compensating for dispersion of an optical fiber in an optical line comprises an optical transmitter 100, a dispersion compensation fiber 110, a circulator 120, a dispersion compensation filter 130, an optical amplifier 140, an optical line 150, and an optical receiver 160.

The optical transmitter 100 is a module for generating and transmitting an optical signal, and includes a DFB distributed feedback Bragg-laser diode (LD) 112 for converting an electrical signal into an optical signal and a modulator 114 for modulating the optical signal. Here, 10Gbps-level transmission equipment is used for the optical transmitter 100. The dispersion compensation fiber 110 is connected to the optical transmitter 100 and compensates for dispersion in the optical line 150. A compensation of −340 ps/nm/km is possible. The circulator 120 receives an optical signal dispersion-compensated by the dispersion compensation fiber 110 and outputs the same to the dispersion compensation filter 130, and receives an optical signal dispersion-regulated by the dispersion compensation filter 130 and outputs the same to the optical amplifier 140.

The dispersion compensation filter 130 is a reflective etalon filter, adjustable by more than ±5 ps/nm, which is connected to the optical amplifier 140. The optical line 150 is a medium for transmitting the dispersion-compensated optical signal and uses a conventional single-mode optical fiber 200 km long. The etalon filter generally generates a positive or negative dispersion value using time delay characteristics of a peak signal value reflected due to resonance of a cavity, and uses a dispersion value determined by sections of the optical line when the optical line is installed. The optical receiver 160 is a module for receiving the optical signal, and uses a 10Gbps receiver.

Figure 2:
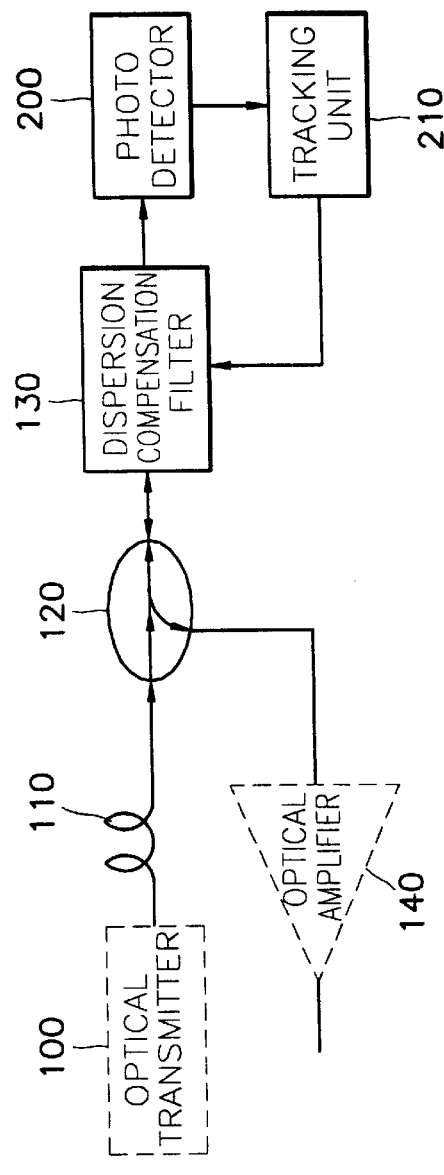
FIG. 2 is a block diagram illustrating a method of using a reflective etalon filter using an optical circulator.

FIG. 2 is a block diagram illustrating a method of using the reflective etalon filter including an optical circulator. A photodetector 200 detects an optical signal having a dispersion value regulated by the dispersion compensation filter 130, and converts the optical signal to an electrical signal. A tracking unit 210 receives the electrical signal converted by the photodetector 200 and automatically adjusts the dispersion of the dispersion compensation filter 130 to achieve zero dispersion.

The dispersion compensation filter 130 can be manually controlled by optical spectrum equipment or a bit error measurer, or automatically controlled electrically by a circuit for automatically tracking dispersion, in order to make the dispersion zero. In FIG. 1, the dispersion of the dispersion compensation filter 130 is manually controlled. In order for dispersion compensation, the dispersion compensation filter 130 can be attached in the middle of the optical line or toward the receive port of the 10Gbps receiver 160. It is more effective if the dispersion compensation filter 130 is attached to the receive port of the 10Gbps receiver 160.

If a bit error tester is not installed in the aforementioned configuration, noise producing about $10^{-10}$ bit errors is generated because sufficient dispersion compensation is not achieved for an optical fiber having a total dispersion of 700 ps/nm at a wavelength of 1.55 μm. On the other hand, when the reflective etalon filter 130 was attached to the dispersion compensation fiber 110, the dispersion of the dispersion compensation fiber 110 was adjusted to −260 ps/nm, and thus the optical line was set to a dispersion of exactly zero. As a result, noise producing $10^{-12}$ bit errors was generated.

Figure 3:
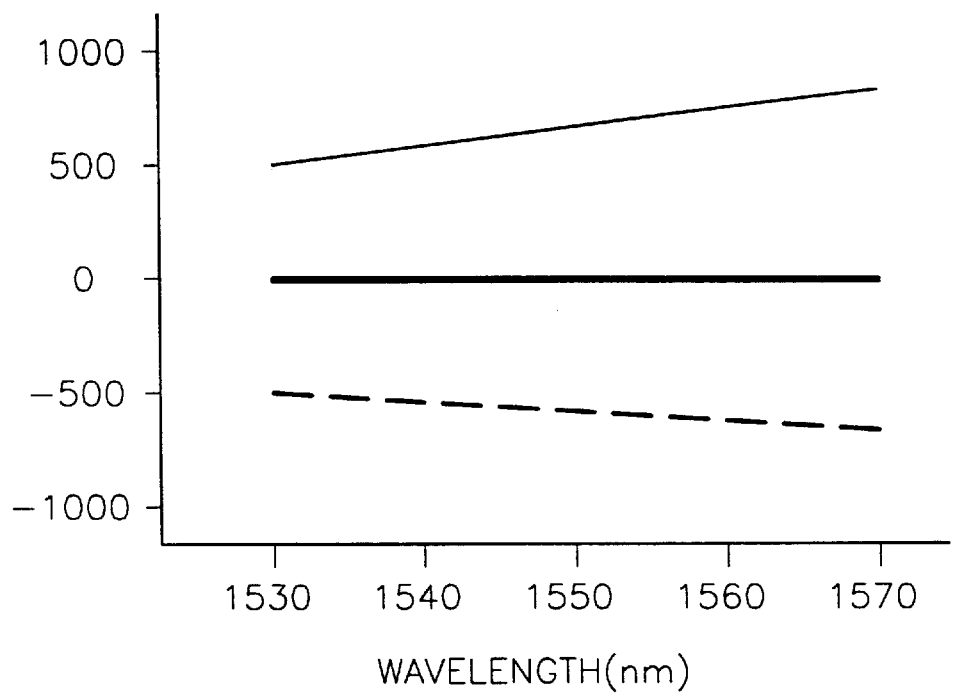
FIG. 3 is a graph illustrating the result when a positive dispersion in an optical line is compensated to zero using a negative dispersion compensation fiber and a dispersion compensation filter.

FIG. 3 is a graph showing the result when the positive dispersion of the optical line is reduced to zero by using a negative dispersion from the dispersion compensation fiber and filter.

According to the present invention, it is easy to achieve exactly zero dispersion by matching the total positive dispersion of an optical fiber in the optical line with the negative dispersion of the dispersion compensation fiber and filter.

In the prior art, when the dispersion value varied with the deterioration of the optical fiber on the optical line, continuous compensation was not possible using only the dispersion compensation fiber. However, in the present invention, continuous compensation is easily made by adding the dispersion compensation filter.

With a dispersion compensation fiber that is modularized and packaged and therefore has a constant dispersion, it is difficult to compensate for dispersion of an actual optical line. Also, since sections of the optical line are installed in various lengths, modularization and standardization of the dispersion compensation fiber have not been easy. However, the present invention solves these problems.

What is claimed is:

1. An apparatus for compensating for dispersion of an optical fiber in an optical line comprising:

a dispersion compensation fiber for compensating dispersion of an optical signal produced by an optical transmitter to a first dispersion value, in order to predict and compensate for dispersion generated in an optical line;

a dispersion compensation filter for controlling the dispersion value of the optical signal, after dispersion compensation by the dispersion compensation fiber, to obtain zero overall dispersion;

an optical amplifier for amplifying a signal having a dispersion value adjusted by the dispersion compensation filter and outputting an amplified signal to the optical lines;

a circulator for receiving the optical signal after dispersion compensation by the dispersion compensation fiber and outputting the optical signal received to the dispersion compensation filter, receiving the optical signal having a dispersion value adjusted by the dispersion compensation filter, and outputting the signal having the dispersion value adjusted by the dispersion compensation filter to the optical amplifier;

a photodetector for detecting and converting the optical signal having the dispersion value adjusted by the dispersion compensation filter into an electrical signal; and a tracking unit for receiving the electrical signal from the photodetector and, in response, adjusting the dispersion value of the dispersion compensation filter.

2. The apparatus for compensating for dispersion of an optical fiber in an optical line as claimed in claim 1, wherein the dispersion compensation filter is a reflective etalon filter.

3. The apparatus for compensating for dispersion of an optical fiber in an optical line as claimed in claim 1, wherein the dispersion compensation filter provides manual control of dispersion value.

* * * * *